(12) United States Patent
Bayliss

(10) Patent No.: US 9,189,505 B2
(45) Date of Patent: Nov. 17, 2015

(54) SYSTEM OF AND METHOD FOR ENTITY REPRESENTATION SPLITTING WITHOUT THE NEED FOR HUMAN INTERACTION

(75) Inventor: David Alan Bayliss, Delray Beach, FL (US)

(73) Assignee: LEXISNEXIS RISK DATA MANAGEMENT, INC., Boca Raton, FL (US)

( * ) Notice: Subject to any disclaimer, the term of this patent is extended or adjusted under 35 U.S.C. 154(b) by 404 days.

(21) Appl. No.: 12/852,612

(22) Filed: Aug. 9, 2010

(65) Prior Publication Data

US 2012/0036112 A1  Feb. 9, 2012

(51) Int. Cl.
*G06F 17/30* (2006.01)

(52) U.S. Cl.
CPC .............................. *G06F 17/30303* (2013.01)

(58) Field of Classification Search
CPC ................................................ G60F 17/30303
USPC .................................................. 707/769, 803
See application file for complete search history.

(56) References Cited

U.S. PATENT DOCUMENTS

| 4,543,630 | A | 9/1985 | Neches |
| 4,769,772 | A | 9/1988 | Dwyer |
| 4,860,201 | A | 8/1989 | Stolfo et al. |
| 4,870,568 | A | 9/1989 | Kahle et al. |
| 4,925,311 | A | 5/1990 | Neches et al. |
| 5,006,978 | A | 4/1991 | Neches |
| 5,146,590 | A | 9/1992 | Lorie et al. |
| 5,251,131 | A | 10/1993 | Masand et al. |
| 5,276,899 | A | 1/1994 | Neches |
| 5,303,383 | A | 4/1994 | Neches et al. |
| 5,392,430 | A | 2/1995 | Chen et al. |
| 5,408,649 | A | 4/1995 | Beshears et al. |
| 5,423,037 | A | 6/1995 | Hvasshovd |
| 5,457,797 | A | 10/1995 | Butterworth et al. |
| 5,471,622 | A | 11/1995 | Eadline |
| 5,495,606 | A | 2/1996 | Borden et al. |
| 5,551,027 | A | 8/1996 | Choy et al. |
| 5,551,066 | A | 8/1996 | Stillman et al. |
| 5,555,404 | A | 9/1996 | Torbjornsen et al. |
| 5,590,284 | A | 12/1996 | Corsetto |
| 5,590,319 | A | 12/1996 | Cohen et al. |
| 5,640,485 | A | 6/1997 | Ranta |
| 5,655,080 | A | 8/1997 | Dias et al. |
| 5,692,174 | A | 11/1997 | Birley et al. |

(Continued)

FOREIGN PATENT DOCUMENTS

| WO | 2009132263 | 10/2009 |
| WO | 2010003061 | 7/2010 |

OTHER PUBLICATIONS

"Computation of Weights for Probabilistic Record Linkage Using EM Algorithm" John G. Bauman.*

(Continued)

*Primary Examiner* — Hosain Alam
*Assistant Examiner* — Bruce Witzenburg
(74) *Attorney, Agent, or Firm* — Troutman Sanders LLP; Ryan A. Schneider; Mark Lehi Jones

(57) ABSTRACT

Disclosed is a system for, and method of, determining whether records and entity representations should be delinked. The system and method need no human interaction in order to calculate parameters and utilizing formulas used for the delinking decisions.

28 Claims, 3 Drawing Sheets

(56) References Cited

U.S. PATENT DOCUMENTS

| | | |
|---|---|---|
| 5,694,593 A | 12/1997 | Baclawski |
| 5,715,469 A | 2/1998 | Arning |
| 5,732,400 A | 3/1998 | Mandler et al. |
| 5,745,746 A | 4/1998 | Jhingran et al. |
| 5,754,841 A | 5/1998 | Carino |
| 5,758,314 A | 5/1998 | McKenna |
| 5,799,323 A | 8/1998 | Mosher et al. |
| 5,845,113 A | 12/1998 | Swami et al. |
| 5,857,180 A | 1/1999 | Hallmark et al. |
| 5,878,408 A | 3/1999 | Van Huben et al. |
| 5,884,299 A | 3/1999 | Ramesh et al. |
| 5,890,159 A | 3/1999 | Sealby et al. |
| 5,897,638 A | 4/1999 | Lasser et al. |
| 5,905,904 A | 5/1999 | Bird et al. |
| 5,970,495 A | 10/1999 | Baru et al. |
| 5,983,228 A | 11/1999 | Kobayashi et al. |
| 6,006,249 A | 12/1999 | Leong |
| 6,026,394 A | 2/2000 | Tsuchida et al. |
| 6,026,398 A | 2/2000 | Brown et al. |
| 6,081,801 A | 6/2000 | Cochrane et al. |
| 6,108,763 A | 8/2000 | Grondalski |
| 6,115,713 A | 9/2000 | Pascucci et al. |
| 6,192,391 B1 | 2/2001 | Ohtani |
| 6,199,069 B1 | 3/2001 | Dettinger et al. |
| 6,256,621 B1 | 7/2001 | Tsuchida et al. |
| 6,266,804 B1 | 7/2001 | Isman |
| 6,304,882 B1 | 10/2001 | Strellis et al. |
| 6,311,169 B2 | 10/2001 | Duhon |
| 6,330,552 B1 | 12/2001 | Farrar et al. |
| 6,374,241 B1 | 4/2002 | Lamburt et al. |
| 6,377,959 B1 | 4/2002 | Carlson |
| 6,389,429 B1 | 5/2002 | Kane et al. |
| 6,424,973 B1 | 7/2002 | Baclawski |
| 6,426,947 B1 | 7/2002 | Banker et al. |
| 6,427,148 B1 | 7/2002 | Cossock |
| 6,430,552 B1 | 8/2002 | Corston-Oliver |
| 6,490,592 B1 | 12/2002 | St. Denis et al. |
| 6,510,428 B2 | 1/2003 | Tsuchida et al. |
| 6,523,019 B1 | 2/2003 | Borthwick |
| 6,523,041 B1 | 2/2003 | Morgan et al. |
| 6,546,403 B1 | 4/2003 | Carlson, Jr. et al. |
| 6,560,597 B1 * | 5/2003 | Dhillon et al. ............ 1/1 |
| 6,567,806 B1 | 5/2003 | Tsuchida et al. |
| 6,658,412 B1 | 12/2003 | Jenkins et al. |
| 6,785,370 B2 | 8/2004 | Glowny et al. |
| 6,816,854 B2 | 11/2004 | Reiner et al. |
| 6,963,871 B1 | 11/2005 | Hermansen et al. |
| 6,968,335 B2 | 11/2005 | Bayliss et al. |
| 6,983,317 B1 | 1/2006 | Bishop et al. |
| 6,990,503 B1 | 1/2006 | Luo et al. |
| 7,152,060 B2 | 12/2006 | Borthwick et al. |
| 7,185,003 B2 | 2/2007 | Bayliss et al. |
| 7,240,059 B2 | 7/2007 | Bayliss et al. |
| 7,293,024 B2 | 11/2007 | Bayliss et al. |
| 7,333,998 B2 | 2/2008 | Heckerman et al. |
| 7,403,942 B1 | 7/2008 | Bayliss |
| 7,406,461 B1 | 7/2008 | Chapman |
| 7,657,540 B1 | 2/2010 | Bayliss |
| 7,720,846 B1 | 5/2010 | Bayliss |
| 7,752,064 B2 | 7/2010 | Kauffman |
| 7,778,997 B1 | 8/2010 | Chapman |
| 7,783,658 B1 | 8/2010 | Bayliss |
| 7,797,333 B1 | 9/2010 | Chapman |
| 7,912,842 B1 | 3/2011 | Bayliss |
| 7,917,495 B1 | 3/2011 | Chapman |
| 8,090,733 B2 | 1/2012 | Bayliss |
| 8,190,616 B2 | 5/2012 | Bayliss |
| 8,285,725 B2 | 10/2012 | Bayliss |
| 2001/0013049 A1 | 8/2001 | Ellis, III |
| 2001/0014888 A1 | 8/2001 | Tsuchida et al. |
| 2002/0007284 A1 | 1/2002 | Schurenberg et al. |
| 2002/0065870 A1 | 5/2002 | Baehr-Jones et al. |
| 2002/0073099 A1 | 6/2002 | Gilbert et al. |
| 2002/0073138 A1 | 6/2002 | Gilbert et al. |
| 2002/0156793 A1 | 10/2002 | Jaro |
| 2002/0184222 A1 | 12/2002 | Kohut et al. |
| 2003/0013951 A1 | 1/2003 | Stefanescu et al. |
| 2003/0037048 A1 | 2/2003 | Kabra et al. |
| 2003/0065595 A1 | 4/2003 | Anglum |
| 2003/0093260 A1 | 5/2003 | Dagtas et al. |
| 2003/0126156 A1 | 7/2003 | Stoltenberg et al. |
| 2003/0153299 A1 | 8/2003 | Perfit et al. |
| 2003/0154285 A1 | 8/2003 | Berglund et al. |
| 2003/0167253 A1 | 9/2003 | Meinig |
| 2004/0019593 A1 | 1/2004 | Borthwick et al. |
| 2004/0064447 A1 | 4/2004 | Simske et al. |
| 2004/0068339 A1 | 4/2004 | Cheetham et al. |
| 2004/0088322 A1 | 5/2004 | Elder et al. |
| 2004/0098359 A1 | 5/2004 | Bayliss et al. |
| 2004/0098371 A1 | 5/2004 | Bayliss et al. |
| 2004/0098372 A1 | 5/2004 | Bayliss et al. |
| 2004/0098373 A1 | 5/2004 | Bayliss et al. |
| 2004/0098374 A1 | 5/2004 | Bayliss et al. |
| 2004/0098390 A1 | 5/2004 | Bayliss et al. |
| 2004/0172393 A1 | 9/2004 | Kazi et al. |
| 2005/0071743 A1 | 3/2005 | Harrington et al. |
| 2005/0154664 A1 | 7/2005 | Guy et al. |
| 2006/0020611 A1 | 1/2006 | Gilbert et al. |
| 2006/0080283 A1 | 4/2006 | Shipman |
| 2006/0116995 A1 | 6/2006 | Bloedorn |
| 2006/0184460 A1 | 8/2006 | Cleary |
| 2006/0213976 A1 | 9/2006 | Inakoshi et al. |
| 2007/0208694 A1 | 9/2007 | Bayliss et al. |
| 2007/0271292 A1 | 11/2007 | Acharya et al. |
| 2007/0299697 A1 | 12/2007 | Friedlander et al. |
| 2008/0005106 A1 | 1/2008 | Schumacher et al. |
| 2008/0010296 A1 | 1/2008 | Bayliss et al. |
| 2008/0077570 A1 | 3/2008 | Tang et al. |
| 2008/0133502 A1 | 6/2008 | Gurevich et al. |
| 2008/0208780 A1 | 8/2008 | Hoopes et al. |
| 2008/0226130 A1 | 9/2008 | Kansal et al. |
| 2008/0243885 A1 | 10/2008 | Harger et al. |
| 2008/0244008 A1 | 10/2008 | Wilkinson et al. |
| 2009/0012971 A1 | 1/2009 | Hunt et al. |
| 2009/0018996 A1 | 1/2009 | Hunt et al. |
| 2009/0106245 A1 | 4/2009 | Salcedo |
| 2009/0271359 A1 | 10/2009 | Bayliss |
| 2009/0271363 A1 | 10/2009 | Bayliss |
| 2009/0271397 A1 | 10/2009 | Bayliss |
| 2009/0271404 A1 | 10/2009 | Bayliss |
| 2009/0271405 A1 | 10/2009 | Bayliss |
| 2009/0271424 A1 | 10/2009 | Bayliss |
| 2009/0271694 A1 | 10/2009 | Bayliss |
| 2009/0287689 A1 | 11/2009 | Bayliss |
| 2009/0292694 A1 | 11/2009 | Bayliss |
| 2009/0292695 A1 | 11/2009 | Bayliss |
| 2010/0005056 A1 | 1/2010 | Bayliss |
| 2010/0005057 A1 | 1/2010 | Bayliss |
| 2010/0005078 A1 | 1/2010 | Bayliss |
| 2010/0005079 A1 | 1/2010 | Bayliss |
| 2010/0010988 A1 | 1/2010 | Bayliss |
| 2010/0017399 A1 | 1/2010 | Bayliss |

OTHER PUBLICATIONS

U.S. Appl. No. 10/357,489, filed Feb. 4, 2005, Bayliss et al.
U.S. Appl. No. 10/357,405, filed Feb. 4, 2003, Bayliss et al.
International Search Report and Written Opinion for related PCT Patent Application No. PCT/US2009/049522 dated Oct. 22, 2009.
International Search Report and Written Opinion for related PCT Patent Application No. PCT/US2009/041649 dated Aug. 13, 2009.
Price, Jeffery R. et al., "Face Recognition Using Direct, Weighted Linear Discriminant Analysis and Modular Subspaces", The Journal of the Pattern Recognition Society, vol. 38, pp. 209-219, 2005.
Schallehn, Eike et al., "Advanced Grouping and Aggregation for Data Integration", Department of Computer Science, University of Magdeburg, Paper ID: 222, pp. 1-16, 2001.
Coppola, Vincent, "Killer APP". Men's Journal, vol. 12, No. 3, pp. 86-90, Apr. 2003.
Schallehn, Eike et al., "Extensible and Similarity-Based Grouping for Data Integration", Department of Computer Science, University of Magdeburg, pp. 1-17, 2002.

(56) References Cited

OTHER PUBLICATIONS

Ananthakrishna, Rohit et al., "Eliminating Fuzzy Duplicates in Data Warehouses", Proceedings of the 28th VLDB Conference, Hong Kong, Chia, pp. 1-12, 2002.

Christen, Peter et al., "Parallel Computing Techniques for High-Performance Probabilistic Record Linkage", Data Mining Group, Australian National University, Epidemiology and Surveillance Branch, Project Web Page: http://datamining.anu.edu.au/linkage.html. pp. 1-11, 2002.

Christen, Peter et al., "Parallel Techniques for High-Performance Record Linkage (Data Matching)", Data Mining Group, Australian National University, Epidemiology and Surveillance Branch, Project Web Page: http://datamining.anu.edu.au/linkage.html, pp. 1-27, 2002.

Christen, Peter et al., "High-Performance Computing Techniques for Record Linkage", Data Mining Group, Australian National University, Epidemiology and Surveillance Branch, Project Web Page: http://datamining.anu.edu.au/linkage.html, pp. 1-14, 2002.

Winkler, William E., "Matching and Record Linkage", U.S. Bureau of Census, pp. 1-38, 1998.

Christen, Peter et al., "High-Performance Computing Techniques for Record Linkage", Data Mining Group, Australian National University, Epidemiology and Surveillance Branch, Project Web Page: http://datamining.anu.edu.au/linkage.html, pp. 1-11, 2002.

Winkler, William E., "The State of Record Linkage and Current Research Problems", Bureau of Census, Statistical Research Division, Washington, D.C., pp. 1-15, 1999.

Winkler, William E., "Advanced Methods for Record Linkage", Bureau of Census, Washington, D.C., pp. 1-24, 1994.

Winkler, William E., "Frequency-Based Matching in Fellegi-Sunter Model of Record Linkage", Bureau of Census, Statistical Research Division, Washington, D.C., pp. 1-14, Oct. 4, 2000.

Winkler, William E., "State of Statistical Data Editing and Current Research Problems", Bureau of the Census Statistical Research Division, pp. 1-10, 1999.

"The First Open ETL/EAI Software for the Real-Time Enterprise, Sunopsis, A New Generation ETL Tool, Sunopsis™ v3 Expedites Integration Between Heterogeneous Systems for Data Warehouse, Data Mining, Business Intelligence, and OLAP Projects", Retrieved Online at http://www.sunopsis.com, pp. 1-7, 2011.

Dumas, Alain, "The ETL Market and Sunopsis™ v3, Business Intelligence, Data Warehouse & Datamart Projects", Sunopsis, pp. 1-8, 2002.

Teradata Warehouse Solutions, "Teradata Database Technical Overview", Retrieved Online at http://www.teradata.com/brochures/Teradata-Solution-Technical-Overview-eb3025/?type=BR, pp. 1-7, 2002.

"WX/DES—Technical Information", WhiteCross White Paper, pp. 1-36, May 25, 2000.

"Teradata and Ab Initio", Teradata Alliance Solutions, pp. 1-2, 2000.

Christen, Peter et al., "Febri-Freely Extensible Biomedical Record Linkage", The Australian National University, pp. 1-77, Oct. 2002.

Winkler, William E., "Using the EM Algorithm for Weight Computation in the Fellegi-Sunter Model of Record Linkage", Bureau of the Census, Statistical Research Division, Statistical Reserach Report Series No. RR2000/05 Washington, D.C., pp. 1-12, Oct. 4, 2000.

Winkler, William E. et al., "An Application of the Fellegi-Sunter Model of Record Linkage to the 1990 U.S. Decennial Census", U.S. Bureau of the Census, pp. 1-22.

Winkler, William E., "Improved Decision Rules in the Fellegi-Sunter Model of Record Linkage", Bureau of the Census, Washington, D.C., pp. 1-15.

Scheuren, Fritz et al., "Recursive Merging and Analysis of Administrative Lists and Data", U.S. Bureau of the Census, Washington, D.C., pp. 1-9.

Winkler, William E., "Record Linkage Software and Methods for Merging Administrative Lists", Bureau of the Census, Statistical Research Division, Washington, D.C., pp. 1-11, Jul. 23, 2001.

"Enterprises", Publishing and Broadcasting Limited, Acxiom-Abilitec, pp. 44-45, Cover Page.

"Credit Reporting System", TransUnion Credit Reporting System, Retrieved Online at http://www.transunion.com/content/page.jsp?id=/transunion/general/data/business/buscre . . . , pp. 1-4, Oct. 9, 2002.

"ID Verification & Fraud Detection. Account Acquisition, Accounting Management. Collection & Location Services, Employment Screening. Risk Management, Automotive, Banking—Savings and Loans. Credit Card Providers, Credit Unions, Energy & Utilities, Healthcare, Insurance, Investment, Real Estate, Telecommunications", TransUnion Credit Reporting System, Retrieved Online at http://www.transunion.com, pp. 1-47, Oct. 9, 2002.

"White Paper an Introduction to OLAP Multidimensional Terminology and Technology", pp. 1-20.

Jaro, Matthew A., "Probabilistic Linkage of Large Public Health Data Files", Statistic in Medicine, vol. 14, pp. 491-498, 1995.

\* cited by examiner

200

SYSTEM OF AND METHOD FOR ENTITY REPRESENTATION SPLITTING WITHOUT THE NEED FOR HUMAN INTERACTION

CROSS REFERENCE TO RELATED APPLICATIONS

The following patents and patent applications are related to the present disclosure and are hereby incorporated by reference in their entireties:

U.S. Pat. No. 7,293,024 entitled "Method for sorting and distributing data among a plurality of nodes" to Bayliss et al.;

U.S. Pat. No. 7,240,059 entitled "System and method for configuring a parallel-processing database system" to Bayliss et al.;

U.S. Pat. No. 7,185,003 entitled "Query scheduling in a parallel-processing database system" to Bayliss et al.;

U.S. Pat. No. 6,968,335 entitled "Method and system for parallel processing of database queries" to Bayliss et al.;

U.S. patent application Ser. No. 10/357,447 entitled "Method and system for processing data records" to Bayliss et al.;

U.S. patent application Ser. No. 10/357,481 entitled "Method and system for linking and delinking data records" to Bayliss et al.;

U.S. patent application Ser. No. 10/293,482 entitled "Global-results processing matrix for processing queries" to Bayliss et al.;

U.S. patent application Ser. No. 10/293,475 entitled "Failure recovery in a parallel-processing database system" to Bayliss et al.;

U.S. patent application Ser. No. 10/357,418 entitled "Method and system for processing and linking data records" to Bayliss et al.;

U.S. patent application Ser. No. 10/357,405 entitled "Method and system for processing and linking data records" to Bayliss et al.;

U.S. patent application Ser. No. 10/357,489 entitled "Method and system for associating entities and data records" to Bayliss et al.;

U.S. patent application Ser. No. 10/357,484 entitled "Method and system for processing data records" to Bayliss et al.;

U.S. patent application Ser. No. 11/671,090 entitled "Query scheduling in a parallel-processing database system" to Bayliss et al.;

U.S. patent application Ser. No. 11/772,634 entitled "System and method for configuring a parallel-processing database system" to Bayliss et al.; and U.S. patent application Ser. No. 11/812,323 entitled "Multi-entity ontology weighting systems and methods" to Bayliss.

The above applications are referred to herein as the "First Generation Patents And Applications." This disclosure may refer to various particular features (e.g., figures, tables, terms, etc.) in the First Generation Patents And Applications. In the case of any ambiguity of what is being referred to, the features as described in U.S. patent application Ser. No. 11/772,634 entitled "System and method for configuring a parallel-processing database system" to Bayliss et al. shall govern.

Also incorporated by reference in their entireties are:

U.S. patent application Ser. No. 12/188,742 entitled "Database systems and methods for linking records and entity representations with sufficiently high confidence" to Bayliss;

U.S. patent application Ser. No. 12/429,337 entitled "Statistical record linkage calibration for multi token fields without the need for human interaction" to Bayliss;

U.S. patent application Ser. No. 12/429,350 entitled "Automated selection of generic blocking criteria" to Bayliss;

U.S. patent application Ser. No. 12/429,361 entitled "Automated detection of null field values and effectively null field values" to Bayliss;

U.S. patent application Ser. No. 12/429,370 entitled "Statistical record linkage calibration for interdependent fields without the need for human interaction" to Bayliss;

U.S. patent application Ser. No. 12/429,377 entitled "Statistical record linkage calibration for reflexive, symmetric and transitive distance measures at the field and field value levels without the need for human interaction" to Bayliss;

U.S. patent application Ser. No. 12/429,382 entitled "Statistical record linkage calibration at the field and field value levels without the need for human interaction" to Bayliss;

U.S. patent application Ser. No. 12/429,394 entitled "Statistical record linkage calibration for reflexive and symmetric distance measures at the field and field value levels without the need for human interaction" to Bayliss;

U.S. patent application Ser. No. 12/429,403 entitled "Adaptive clustering of records and entity representations" to Bayliss;

U.S. patent application Ser. No. 12/429,408 entitled "Automated calibration of negative field weighting without the need for human interaction" to Bayliss;

U.S. patent application Ser. No. 12/496,861 entitled "Statistical measure and calibration of search criteria where one or both of the search criteria and database is incomplete" to Bayliss;

U.S. patent application Ser. No. 12/496,876 entitled "A system and method for identifying entity representations based on a search query using field match templates" to Bayliss;

U.S. patent application Ser. No. 12/496,888 entitled "Batch entity representation identification using field match templates" to Bayliss;

U.S. patent application Ser. No. 12/496,899 entitled "System for and method of partitioning match templates" to Bayliss;

U.S. patent application Ser. No. 12/496,915 entitled "Statistical measure and calibration of internally inconsistent search criteria where one or both of the search criteria and database is incomplete" to Bayliss;

U.S. patent application Ser. No. 12/496,929 entitled "Statistical measure and calibration of reflexive, symmetric and transitive fuzzy search criteria where one or both of the search criteria and database is incomplete" to Bayliss;

U.S. patent application Ser. No. 12/496,948 entitled "Entity representation identification using entity representation level information" to Bayliss; and U.S. patent application Ser. No. 12/496,965 entitled "Technique for recycling match weight calculations" to Bayliss.

These applications are referred to herein as the "Second Generation Patents And Applications."

Also incorporated by reference in their entireties are U.S. patent application Ser. No. 10/866,456 entitled "System and method for returning results of a query from one or more slave nodes to one or more master nodes of a database system" to Chapman et al., U.S. patent application Ser. No. 10/866,204 entitled "System and method for processing query requests in a database system" to Chapman et al., U.S. patent application Ser. No. 10/866,565 entitled "System and method for processing a request to perform an activity associated with a precompiled query" to Chapman et al., and U.S. patent application Ser. No. 10/866,394 entitled "System and method for managing throughput in the processing of query requests in a database system" to Chapman et al. These applications are referred to herein as the "'866 Applications." This disclosure may refer to various particular features (e.g., figures, tables, terms, etc.) in the '866 Applications. In the case of any ambiguity of what is being referred to, the features as described in U.S. patent application Ser. No. 10/866,204 entitled "System and method for processing query requests in a database system" to Chapman et al. shall govern.

FIELD OF THE INVENTION

The invention relates to database systems and methods. More particularly, the invention relates to techniques for delinking records in a database. Certain embodiments allow for accurate de-linkage of records using an iterative process without the need for human interaction.

SUMMARY OF THE CLAIMED INVENTION

Certain embodiments are disclosed herein. Such exemplary embodiments include a system, and computer implemented process, for delinking entity representations in a computer implemented electronic database using a bloat index formula. The electronic database includes a plurality of entity representations, each entity representation includes a plurality of linked electronic records, each electronic record including a plurality of fields, each field capable of containing a field value. The exemplary embodiments include calculating a field inconsistency weight for a plurality of fields, wherein each field inconsistency weight is derived from a field inconsistency probability associated with the corresponding field and each field inconsistency probability reflects a likelihood that an arbitrary entity representation includes records with different field values in the corresponding field. The exemplary embodiments also include selecting an entity representation in the electronic database. The exemplary embodiments further include calculating a bloat index reflecting a sum of field inconsistency weights over a plurality of fields common to a plurality of linked electronic records of the selected entity representation. The exemplary embodiments further include determining, based on the bloat index and a size of a population associated with the database, whether there is a sufficiently high confidence level that the plurality of linked electronic records of the entity representation do not correspond to a same individual. The exemplary embodiments further include delinking, in the electronic database, the plurality of linked electronic records of the entity representation based on the determining.

Such exemplary embodiments also include a system, and computer implemented process, for delinking entity representations in a computer implemented electronic database along a cleave point. The electronic database includes a plurality of entity representations, each entity representation includes a plurality of linked electronic records, each electronic record includes a plurality of fields, each field capable of containing a field value. The exemplary embodiments include calculating a field inconsistency weight for each of a plurality of fields, wherein each field inconsistency weight is derived from a field inconsistency probability associated with the corresponding field and each field inconsistency probability reflects a likelihood that an arbitrary entity representation includes records with different field values in the corresponding field. The exemplary embodiments also include selecting a subset of fields of the electronic database, wherein a total of field inconsistency weights of the selected subset of fields exceeds a threshold. The exemplary embodiments further include identifying an entity representation in the electronic database having inconsistent field values in each field in the selected subset of fields. The exemplary embodiments further include delinking the entity representation along a cleave point based on the identifying, whereby at least two separate entity representations are generated.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION

Figure 1:
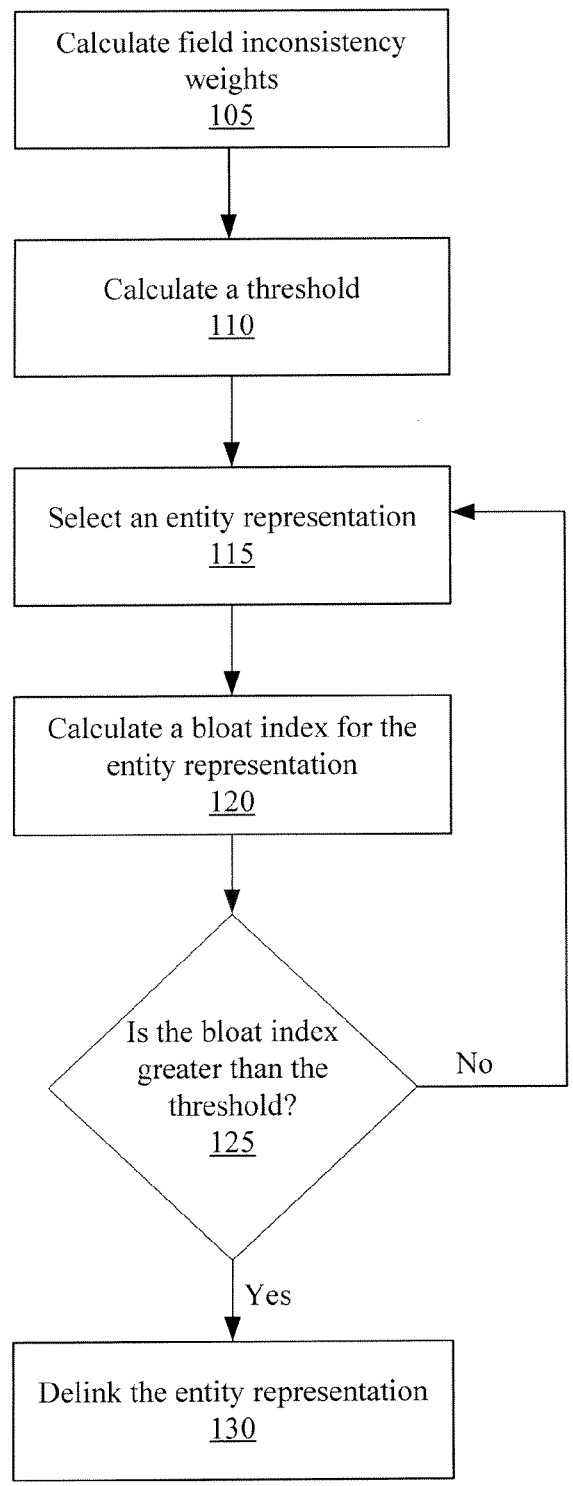
FIG. 1 illustrates a flowchart depicting an embodiment of an invention.

The following detailed description presents several inventive concepts, which are inter-related. Certain terms used herein are discussed presently. The term "entity representation" encompasses at least one electronic record, and, more typically, a collection of linked electronic records that refer to the same individual. This term is meant to embrace the computer implemented entities of the First Generation Patents And Applications. The term "field" encompasses any portion of a record into which a field value may be entered. The term "field value" encompasses means and manners used to represent information, not limited to numerical values. A "field value" may include other types of data values comprising one or more character types or combination of character types. This term is meant to embrace the "data field values" of the First Generation Patents And Applications. The term "token" encompasses any part of a field value, including the entirety of a field value. The term "individual" encompasses a natural person, a company, a body of work, and any institution. The term "probability" encompasses any quantitative measure of likelihood or possibility, not limited to numerical quantities between zero and one. The term "record" encompasses any data structure having at least one field. This term is meant to embrace the "entity references" of the First Generation Patents And Applications. The discussion in this paragraph is meant to provide instances of what is embraced by certain terms by way of non-limiting example and should not be construed as restricting the meaning of such terms.

Some embodiments of the present invention provide for correcting incorrect groupings of linked records in entity representations as records are added to an electronic database. In the early stages of an electronic database, it may be reasonable to link certain ambiguous records to the same entity representation. Later, after additional data is added to the electronic database, it may become clear that some of the original or existing linking is erroneous. Furthermore, since matching records typically may be a probabilistic process, erroneous links may result. Accordingly, embodiments of the present invention provide techniques for delinking records associated with the same entity representation. In one embodiment, a technique for delinking determines whether an entity representation is "bloated" without human interaction. In such an embodiment, each record linked in a bloated entity representation is be delinked.

In another embodiment, a technique for delinking detects cleave points in entity representations without human interaction. In such an embodiment, an entity representation is split (e.g., delinked) into at least two separate entity representations by delinking records along a cleave point.

In certain embodiments, the delinking techniques described herein may be performed iteratively before, during, or after any database process. That is, the delinking techniques may be performed before or after a first iteration of a database process, a second iteration of a database process, a third iteration of a database process, etc. In such embodiments, the delinking techniques may be performed as an intermediate operation among one or more of those described with reference to block 220 of FIG. 2 in U.S. patent application Ser. No. 12/429,408 entitled "Automated Calibration Of Negative Field Weighting Without The Need For Human Interaction," filed on Apr. 24, 2009, which is incorporated by reference herein in its entirety. For example, the delinking techniques described herein may be performed iteratively before, during, or after any, or a combination, of a linking operation, a preliminary linking operation, a transitional linking operation, a propagation operation, and a delinking operation, as such operations are disclosed in Sections I and II of U.S. patent application Ser. No. 12/429,408. When additional information is added to the electronic database, the delinking processes described herein may be iterated one or more additional times in order to ensure that the original links and existing links are not erroneous. In certain embodiments, the delinking techniques described herein may be performed sporadically, e.g., independently of the iterated operations disclosed in Sections I and II of U.S. patent application Ser. No. 12/429,408.

In an embodiment, a delinking technique may be used in an electronic database to delink records and entity representations. More particularly, this delinking technique is used to consider entity representations and decide whether such entity representations are bloated (e.g., erroneously linked) and should be delinked. The delinking technique presently discussed may be used and integrated with other delinking techniques discussed herein.

FIG. 1 is a flowchart depicting an exemplary embodiment of an invention. In general, the depicted delinking technique operates by comparing a bloat index (e.g., calculated using a bloat index formula shown in Equation 5 below) associated with an entity representation to a threshold (e.g., calculated using Equation 4 below). If, for example, the bloat index is determined to be greater than the threshold, the delinking technique delinks each record of the entity representation under consideration. If, however, the bloat index is determined to be less than or equal to the threshold, the delinking technique selects another entity representation to consider.

In general, embodiments of the delinking technique may calculate, for each entity representation, a bloat index that includes a sum of field inconsistency weights. That is, each entity representation may be associated with a bloat index that is calculated by summing the field inconsistency weights associated with the entity representation. If the sum of the field inconsistency weights (e.g., the bloat index) for a given entity representation exceeds a threshold, the records of the entity representation are delinked.

At block 105, the exemplary embodiment calculates field inconsistency weights. In certain embodiments, the field inconsistency weights utilized in the bloat index formula may be derived from field inconsistency probabilities. The field inconsistency probabilities are converted to field inconsistency weights. These field inconsistency weights are used in the bloat index formula in order to determine whether to delink records of an entity representation under consideration. A separate field inconsistency weight may be associated with each field appearing in any record in the electronic database; however, in some embodiments such field inconsistency weights may be associated with only a subset of the totality of fields appearing in any record in the electronic database. In certain embodiments that utilize an iterative process to generate field inconsistency probabilities, which are converted into field inconsistency weights, each iteration of such process may produce increasingly accurate field inconsistency probabilities and field inconsistency weights.

The field inconsistency weights described herein encompass the negative field weights of Section IX of U.S. patent application Ser. No. 12/429,408 entitled "Automated Calibration Of Negative Field Weighting Without The Need For Human Interaction," filed on Apr. 24, 2009, which is incorporated by reference herein in its entirety. Note that field inconsistency weights may be set as negative numbers in some instances and positive numbers in other instances, but the term "field inconsistency weight" embraces both uses.

A field inconsistency probability may be calculated for each field appearing in any record in the electronic database as follows. First, for each field f, a count is made of entity representations that have the property that they include two linked records that have different field values in field f. That count is divided by the total number of entity representations yielding a field inconsistency probability. Thus, for each field appearing in any record in the electronic database, a field inconsistency probability is calculated as, by way of non-limiting example:

$$p_f = \frac{K_f}{K}. \quad \text{Equation 1}$$

In Equation 1, $K_f$ represents the number of entity representations that include two records with different field values in field f, K represents the total number of entity representations, and $p_f$ denotes a field inconsistency probability for field f. In some embodiments, the term K is determined as the number of entity representations that include at least two different records. Note that K and $K_f$ may be computed during an iteration according to the techniques set forth in, for example, Section II of U.S. patent application Ser. No. 12/429,408 entitled "Automated Calibration Of Negative Field Weighting Without The Need For Human Interaction," filed on Apr. 24, 2009, which is incorporated by reference herein in its entirety. More particularly, these terms may be computed as part of such an iteration and stored for use according to a delinking technique presently discussed. Each field inconsistency probability is then converted to a field inconsistency weight by applying Equation 2 below to the result of Equation 1.

In some embodiments, $K_f$ may represent the number of entity representations that include three records with different field values in field f. In other embodiments, $K_f$ may represent the number of entity representations that include four records with different field values in field f. Accordingly, field inconsistency probabilities may be calculated with a $K_f$ term that represents a number of entity representations that include any number of records with different field values in field f.

In some embodiments, whether there is a sufficient difference in field values between records may be determined using techniques described in the First Generation Patents And Applications of the Second Generation Patents And Applications. For example, whether there is a sufficient difference in field values between records may be determined in accordance with the techniques described in Sections III, IV, or X of U.S. patent application Ser. No. 12/429,408 entitled "Automated Calibration Of Negative Field Weighting Without The Need For Human Interaction," filed on Apr. 24, 2009, which is incorporated by reference herein in its entirety. In another example, whether there is a sufficient difference in field values between records may be determined in accordance with the techniques described in Section VI of U.S. patent application Ser. No. 12/496,876 entitled "A System And Method For Identifying Entity Representations Based On A Search Query Using Field Match Templates," filed on Jul. 2, 2009, which is incorporated by reference herein in its entirety.

In general, field inconsistency probabilities and field inconsistency weights may be stored for later use. For example, these parameters may be stored in one or more lookup tables, alone or together with other relevant parameters. Alternately, or in addition, these parameters may be stored in one or more fields added to each record. By way of non-limiting example, field inconsistency probabilities and field inconsistency weights may be stored in fields added to records in which the associated field values appear. The parameters may be updated with each iteration (per, for example Section II of U.S. patent application Ser. No. 12/429,408) by replacing parameters from prior iterations or by adding newly generated parameters.

In some embodiments, a field inconsistency weight may be manually provided as input to the bloat index formula. That is, a user or implementer of the present invention may input a value representing a field inconsistency weight into one or more computer systems executing the steps of FIG. 1 using an input device (e.g., keyboard, mouse, stylus).

Deriving field inconsistency weights from field inconsistency probabilities may proceed as follows. Note that the field inconsistency weights so produced have the advantage of allowing for easier computer implementation. Certain computers and programming languages are ill-adapted to handle small numbers (e.g., products of probabilities lying in the interval (0,1)), without the risk of introduced rounding error. Conversion to logarithms avoids the problem of rounding error. For example, logarithms of products of numbers become sums of logarithms of the same numbers, using the formulas $\log_b(AB) = \log_b(A) + \log_b(B)$ and $\log_b(A^X) = X\log_b(A)$. Field inconsistency probabilities are converted to field inconsistency weights and back using, by way of non-limiting example, the following formulas:

$$w_f = -\log(p_f); \text{ and} \qquad \text{Equation 2}$$

$$p_f = 2^{-w_f}. \qquad \text{Equation 3}$$

In the above formulas, $w_f$ denotes a field inconsistency weight and $p_f$ denotes a field inconsistency probability. Note that, in general, field inconsistency probabilities may be inversely related to the field inconsistency weights produced according to Equations 2 and 3. The above formulas may be used for converting numbers in general, not limited to field inconsistency probabilities and field inconsistency weights. One of ordinary skill in the art will understand how to convert between standard form and logarithmic form and how to adapt the formulas herein in order to accommodate the different forms. In Equation 2, and throughout this disclosure, by way of non-limiting example, the log function has as its base two (2). Nevertheless, other bases may be used in embodiments of the present inventions, such as, by way of non-limiting example, 2, 3⅓, or 10.

By way of a non-limiting example, an electronic database may include 1000 records that are linked to form 100 entity representations that include at least two different records. Each record of the electronic database may include a First Name field, a Middle Name field, a Last Name field, and a Name Suffix field. Consider the following exemplary values of $K_f$ for these exemplary fields reflected below.

| f | $K_f$ |
|---|---|
| First Name | 6 |
| Middle Name | 12 |
| Last Name | 12 |
| Name Suffix | 3 |

Continuing the non-limiting example, six (6) entity representations of the electronic database include at least two records with different field values in the First Name field, 12 entity representations of the electronic database include at least two records with different field values in the Middle Name field, 12 entity representations of the electronic database include at least two records with different field values in the Last Name field, and three (3) entity representations of the electronic database include at least two records with different field values in the Name Suffix field. Accordingly, field inconsistency probabilities for each of these exemplary fields may be calculated using Equation 1 as follows.

| f | $p_f$ |
|---|---|
| First Name | 0.06 |
| Middle Name | 0.12 |
| Last Name | 0.12 |
| Name Suffix | 0.03 |

Each field inconsistency probability for each field may then be converted to a field inconsistency weight using Equation 2. Accordingly, field inconsistency weights for each of these exemplary fields may be calculated as follows.

| f | $w_f$ |
|---|---|
| First Name | 4.06 |
| Middle Name | 3.06 |
| Last Name | 3.06 |
| Name Suffix | 5.06 |

At block 110, the exemplary embodiment calculates a threshold. In certain embodiments, if a bloat index associated with an entity representation under consideration exceeds a threshold, the records of the entity representation are delinked. A technique for determining such a threshold is disclosed presently. More particularly, a threshold may be calculated as, by way of non-limiting example:

$$T = \log(N) - \log(1-P) - 1. \qquad \text{Equation 4}$$

In the Equation 4, the term N represents the total number of entity representations in the electronic database for a given iteration. Thus, the value of N may depend on the particular stage in the iteration in which Equation 4 is being used. Alternately, if the number of actual individuals represented in the database is known (for example, if the database is meant to reflect a known population, such as undergraduates in a particular university), then that quantity may be used for N. The term P may be selected from the interval [0,1) (i.e., as a number both greater than or equal to zero and less than one) to establish a confidence level. More particularly, if a bloat index is calculated according to the bloat index formula (e.g., shown in Equation 5 below) with respect to an entity representation exceeds a threshold T calculated according to Equation 4, then the probability that the records of the entity representation do not refer to the same individual and should be delinked is at least P. Note that P may be selected from the interval between zero and one, inclusive, and may be converted to a percentage by multiplication by 100. For each additional unit (i.e., 1) added to T, the quantity (1−P) halves (for embodiments that utilize log base two; for other bases, the quantity (1−P) may decrease as a power of the base). A table of thresholds computed for a variety of confidence levels appears below.

| P | T |
|---|---|
| 99% | log(N) + 5.64 |
| 99.9% | log(N) + 8.97 |
| 99.99% | log(N) + 12.28 |

As is apparent from the table, the threshold computed using Equation 4 may be dependent on the number of entity representations in the electronic database. If a bloat index associated with an entity presentation and computed by a bloat index formula (e.g., shown in Equation 5 below) exceeds a threshold T computed using Equation 4, then the probability that the records of the entity representation refer to different individuals and should be delinked is at least as great as the confidence level P. That is, the present delinking technique allows records to be delinked with a specified level of precision, i.e., a probability that a link between the records of the entity representation was erroneous.

After a first linking iteration, with each linking iteration, the number of entity representations in the database may be expected to decrease until it reaches a stable number. Accordingly, the value log(N) in Equation 4 may be reduced with each linking iteration (up to a point) such that with each linking iteration, the threshold required for a given fixed confidence level may be reduced.

In certain embodiments, the threshold T calculated at block 110 may be manually adjusted in accordance with design preferences. That is, the threshold T calculated at block 110 may be increased or decreased to suit specific design needs.

At block 115, the exemplary embodiment selects an entity representation. At block 120, the exemplary embodiment calculates a bloat index for the entity representation selected. By way of non-limiting example, the bloat index of an entity representation may be calculated using the following bloat index formula:

$$B(C) = \sum_f w_f.$$ Equation 5

In Equation 5, a bloat index B(C) represents an index associated with an entity representation C and the sum may be over all fields f of the entity representation C that have different field values in at least two records of entity representation C in field f. Accordingly, the bloat index B(C) may be calculated as the sum of the field inconsistency weights $w_f$ over all fields f of the entity representation C that have different field values in at least two records of entity representation C in field f.

At block 125, the exemplary embodiment compares the threshold T to the bloat index B(C) associated with entity representation C selected. If, for example, the bloat index B(C) associated with entity representation C is greater than threshold T, entity representation C is considered bloated and delinked at block 130. If, however, the bloat index B(C) associated with entity representation C is less than or equal to threshold T, entity representation C is not considered bloated and another entity representation is selected at block 115.

By way of a non-limiting example, entity representation C under consideration may include the following:

| Record | DID | RID | First Name | Middle Name | Last Name | Name Suffix |
|---|---|---|---|---|---|---|
| $r_1$ | 4 | 124 | John | Ray | Smith | Jr. |
| $r_2$ | 4 | 361 | Jon | Ray | Smith | Jr. |
| $r_3$ | 4 | 091 | John | Raymond | Smith | |
| $r_4$ | 4 | 009 | John | Raymond | Smith | Sr. |
| $r_5$ | 4 | 824 | J. | Ray | Smith | Jr. |
| $r_6$ | 4 | 216 | John | Raymond | Smith | Jr. |
| $r_7$ | 4 | 432 | John | Ray | Smith | Jr. |

In certain embodiments, the actual linking of two records may be performed, by way of non-limiting example, as discussed in the First Generation Patents And Applications, e.g., by inserting an identical definitive identifier ("DID") in a DID field of both records. Accordingly, each entity representation in the electronic database is associated with a unique DID. Further, each record in the electronic database may be associated with a unique record identifier ("RID"). Entity representation C above is associated with a unique DID (e.g., 4), and each record in entity representation C is associated with a unique RID.

As shown, entity representation C contains at least two records that have different field values in the First Name field, two records that have different field values in the Middle Name field, and two records that have different field values in the Name Suffix field. In an exemplary situation where the First Name field inconsistency weight is 4.06, the Middle Name field inconsistency weight is 3.06, and the Name Suffix field inconsistency weight is 5.06, the bloat index B(C) is calculated as the sum 12.18=4.06+3.06+5.06. If, for example, the threshold T is nine (9), entity representation C may be determined to be bloated (e.g., erroneously linked) because the bloat index B(C) of entity representation C (e.g., 12.18) is greater than the threshold T. Accordingly, the delinking technique delinks the records of entity representation C.

In the example discussed above, whether there is a sufficient difference in field values between records is determined using string equivalence. In other embodiments, whether there is a sufficient difference in field values between records may be determined using techniques described in the First Generation Patents And Applications of the Second Generation Patents And Applications. For example, whether there is a sufficient difference in field values between records may be determined in accordance with the techniques described in Sections III, IV, or X of U.S. patent application Ser. No. 12/429,408 entitled "Automated Calibration Of Negative Field Weighting Without The Need For Human Interaction," filed on Apr. 24, 2009, which is incorporated by reference herein in its entirety. In another example, whether there is a sufficient difference in field values between records may be determined in accordance with the techniques described in Section VI of U.S. patent application Ser. No. 12/496,876 entitled "A System And Method For Identifying Entity Representations Based On A Search Query Using Field Match Templates," filed on Jul. 2, 2009, which is incorporated by reference herein in its entirety.

In certain embodiments, the field inconsistency weight of a field of an entity representation in which at least two records have different field values may be multiplied by the number of different field values in the field of the entity representation. That is, the field inconsistency weight $w_f$ of a field f of an entity representation C may be multiplied by the number of different field values in the field f of entity representation C. Accordingly, the field inconsistency weight $w_f$ multiplied by the number of different field values in the field f of entity representation C may be used in the bloat index formula shown in Equation 5. By way of non-limiting example, the field inconsistency weight associated with the First Name field (e.g., 4.06) of exemplary entity representation C above, may be multiplied by three (3) since three (3) different field values exist in the First Name field (e.g., John, Jon, J.) in entity representation C. As a result, the bloat index B(C) of entity representation C may be calculated with a $3 \times w_f$ term.

At block 130, the exemplary embodiment delinks the bloated entity representation. Since the records of an entity representation are linked by inserting a unique DID in a DID field of the entity representation, the records of the entity representation may be delinked by changing the field value in the DID field of each record. Further, the records of a bloated entity representation may be delinked by changing the field value in the DID field for each record to the record's RID. By way of non-limiting example, exemplary entity representation C may be delinked as follows:

| Record | DID | RID | First Name | Middle Name | Last Name | Name Suffix |
|---|---|---|---|---|---|---|
| $r_1$ | 124 | 124 | John | Ray | Smith | Jr. |
| $r_2$ | 361 | 361 | Jon | Ray | Smith | Jr. |
| $r_3$ | 091 | 091 | John | Raymond | Smith | |
| $r_4$ | 009 | 009 | John | Raymond | Smith | Sr. |
| $r_5$ | 824 | 824 | J. | Ray | Smith | Jr. |
| $r_6$ | 216 | 216 | John | Raymond | Smith | Jr. |
| $r_7$ | 432 | 432 | John | Ray | Smith | Jr. |

Accordingly, the field value in the DID field of each record of exemplary entity representation C may be changed to the field value in the RID field of the corresponding record. That is, each record of exemplary entity representation C may be uniquely identifiable and detached from (e.g., not linked to) any other record in the electronic database.

It should be noted that multiple entity representations may be considered in parallel to determine whether the entity representations are bloated. That is, the steps performed in FIG. 1 may be performed for multiple entity representations in parallel using one or more parallel processing systems, such as the parallel processing systems described in the First Generation Patents And Applications.

In another embodiment, a delinking technique may be used in an electronic database to split (e.g., delink) entity representations into at least two separate entity representations. More particularly, this delinking technique is used to consider an entity representation and decide whether the entity representation contains a cleave point along which the entity representation should be split (e.g., delinked). The delinking technique presently discussed may be used and integrated with other delinking techniques discussed herein.

Figure 2:
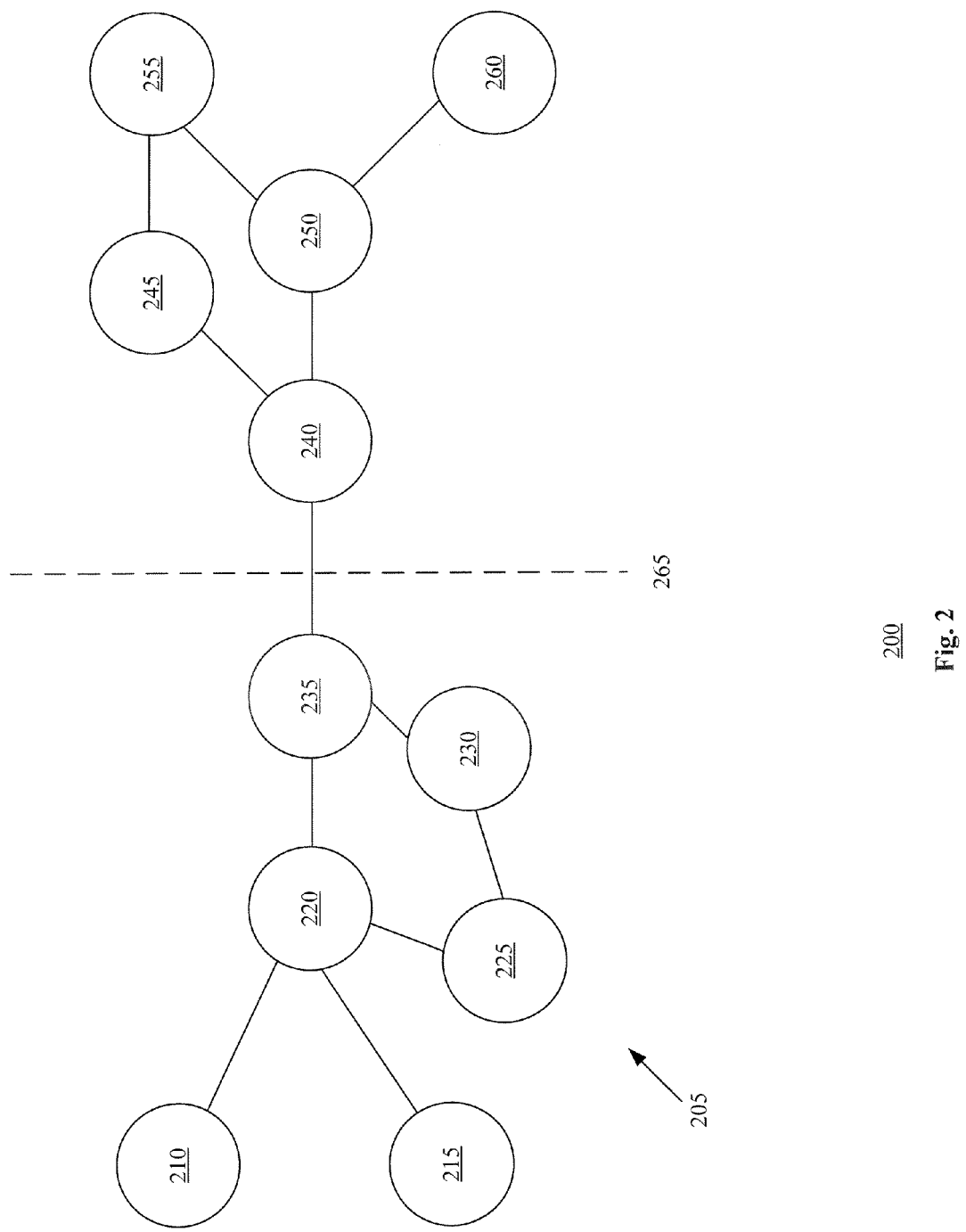
FIG. 2 illustrates an exemplary diagram of an embodiment of an invention.

FIG. 2 is an exemplary diagram of an embodiment of an invention. Diagram 200 of FIG. 2 illustrates an exemplary collection of records 210-260, which may be linked in a common entity representation 205 using the linking techniques described in the First Generation Patents And Applications or the Second Generation Patents And Applications. Since each of the records 210-260 match at least one other record (as indicated by the lines between the records), the collection of records 210-260 may refer to the same individual and entity representation 205. In certain embodiments, the collection of records 210-260 may be represented graphically as entity representation 205 with at least one cleave point. In such embodiments, a cleave point of an entity representation is determined as a point between two records of the entity representation at which the field values in a selected subset of fields of the two records are different. In diagram 200, a cleave point 265 is located between record 235 and record 240. That is, cleave point 265 is a point at which the field values in a selected subset of fields (e.g., Social Security Number field, Date Of Birth field) of records 235, 240 are different. Accordingly, the delinking technique discussed presently may split (e.g., delink) entity representation 205 into at least two separate entity representations along the cleave point 265. As a result of the delinking, records 210-235 are associated with one entity representation and records 240-260 are associated with another entity representation.

Figure 3:
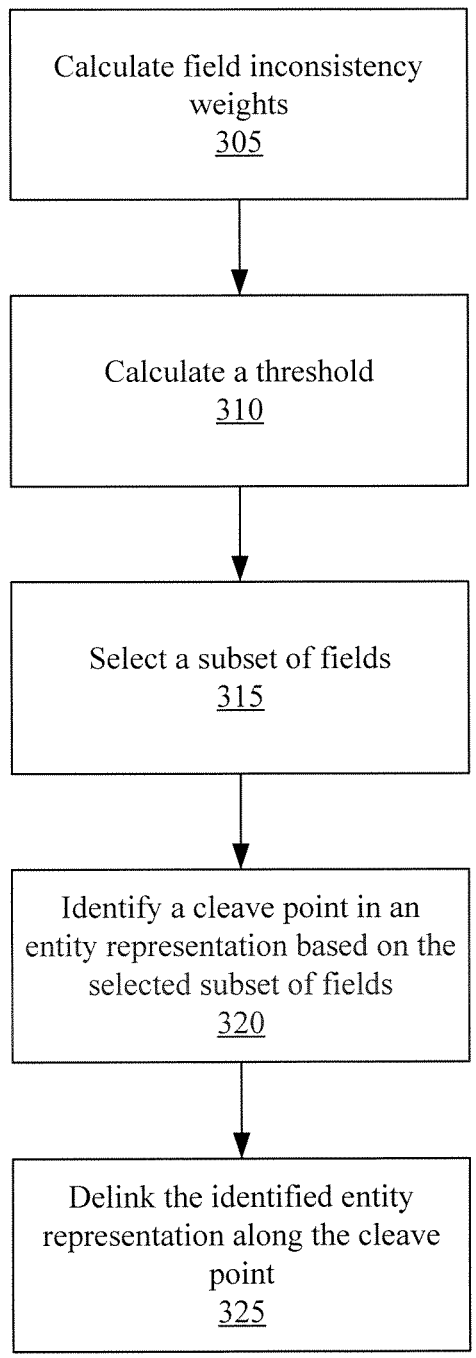
FIG. 3 illustrates a flowchart depicting an embodiment of an invention.

FIG. 3 is a flowchart depicting an exemplary embodiment of an invention. In general, embodiments of the delinking technique may select a subset of fields in which a difference in the field values between two records of an entity representation indicates a cleave point. The delinking technique then identifies cleave points in entity representations of the electronic database using the selected subset of fields. If, for example, a cleave point is located in an entity representation, the delinking technique splits (e.g., delinks) the entity representation into at least two separate entity representations along the cleave point.

At block 305, the exemplary embodiment calculates field inconsistency weights. In certain embodiments, the field inconsistency weights utilized to locate a cleave point may be derived from field inconsistency probabilities. The field inconsistency probabilities are converted to field inconsistency weights. These field inconsistency weights are used to identify a cleave point in an entity representation in order to split the entity representation into at least two separate entity representations along the cleave point. A separate field inconsistency weight may be associated with each field appearing in any record in the electronic database; however, in some embodiments such field inconsistency weights may be associated with only a subset of the totality of fields appearing in any record in the electronic database. In certain embodiments that utilize an iterative process to generate field inconsistency probabilities, which are converted into field inconsistency weights, each iteration of such process may produce increasingly accurate field inconsistency probabilities and field inconsistency weights.

A field inconsistency probability may be calculated for each field appearing in any record in the electronic database as follows. First, a count may be made of entity representations that have the property that they include two linked records that have different field values in field f. That count may be divided by the total number of entity representations. The resulting ratio may be subtracted from one (1), and negated. These operations may be conducted relative to the entity representations that exist during the relevant linking operation (after the relevant iteration). A calculation of one or more of the count, the ratio, the ratio subtracted from one, and the ratio subtracted from one and negated may be made at the time of the first iteration and, for later use, stored in, for example, a lookup table or in an extra field added to one or more records. Thus, for two given records $r_1$ and $r_2$ and for a given field f, if the field values in the given records do not match, then the term $p_f$ may be calculated as, by way of non-limiting example:

$$p_f = \left(1 - \frac{K_f}{K}\right). \quad \text{Equation 6}$$

In Equation 6, $K_f$ represents the number of entity representations that include two records with different field values in field f, and K represents the total number of entity representations. In some embodiments, the term K is determined as the number of entity representations that include at least two different records. Note that K and $K_f$ may be computed during an iteration according to the techniques set forth in, for example, Section II of U.S. patent application Ser. No. 12/429,408. More particularly, these terms may be computed as part of such an iteration and stored for use according to a delinking technique presently discussed. Each field inconsistency probability is then converted to a field inconsistency weight by applying Equation 2 above to the result of Equation 6.

At block 310, the exemplary embodiment calculates a threshold T as described above with reference to block 110 of FIG. 1.

At block 315, the exemplary embodiment selects a subset of fields whose total of field inconsistency weights exceeds a threshold T (e.g., is less than the negative threshold T). In certain embodiments, a subset of fields of the electronic database is selected by ranking the fields of the electronic database by magnitude (e.g., greatest magnitude to smallest magnitude). The delinking technique then select fields, beginning from the top of the ranking (e.g., the fields with the greatest magnitudes), until the total of the field inconsistency weights of the selected fields exceeds a threshold T (e.g., is less than a negative threshold T). By way of a non-limiting example, exemplary field inconsistency weights may be ranked from greatest magnitude to smallest magnitude as follows:

| f | $w_f$ |
|---|---|
| Social Security Number | −24 |
| Date Of Birth | −23 |
| Street Address | −9 |
| Name Suffix | −5 |
| First Name | −4 |
| Middle Name | −3 |
| Last Name | −3 |

Continuing the non-limiting example, a threshold T may be calculated to be 40 (e.g., a negative threshold of −40). Based on the exemplary field inconsistency weights ranked above, the fields with the greatest magnitudes are selected until the total field inconsistency weight of the selected fields exceeds 40 (e.g., is less than −40). Accordingly, in an exemplary situation where the Social Security Number field inconsistency weight is −24 and the Date Of Birth field inconsistency weight is −23, the total field inconsistency weight of the selected subset of fields is calculated as the sum −47=(−24)+ (−23).

In other embodiments, any combination of fields whose total field inconsistency weight exceeds a threshold T (e.g., is less than a negative threshold T) may be selected. That is, any combination of fields whose total field inconsistency weight exceeds a threshold T (e.g., is less than a negative threshold T) may be used to locate cleave points in entity representations of the electronic database. In one exemplary situation where a Social Security Number field inconsistency weight is −24, a Street Address field inconsistency weight is −9, a Name Suffix field inconsistency weight is −5, and a Last Name field inconsistency weight is −3, a first selected subset of fields total field inconsistency weight may be calculated as the sum −41=(−24)+(−9)+(−5)+(−3). In another exemplary situation where a Date Of Birth field inconsistency weight is −23, a Street Address field inconsistency weight is −9, a First Name field inconsistency weight is −4, a Middle Name field inconsistency weight is −3, and a Last Name field inconsistency weight is 3, a second selected subset of fields total field inconsistency weight may be calculated as the sum −42=(−23)+(−9)+(−4)+(−3)+(−3).

In some embodiments, a field may be selected by comparing the field inconsistency probability associated with the field to a threshold. For example, fields in which two different field values exist between two records less than 25% of the time may be selected. In other embodiments, a field may be selected by comparing the field inconsistency weight associated with the field to a threshold. In other embodiments, a field may be selected by comparing a term consisting of the product of the field inconsistency probability and the field inconsistency weight associated with the field to a threshold.

At block 320, the exemplary embodiment identifies a cleave point in an entity representation using the selected subset of fields. A cleave point in an entity representation may be identified using one or more database operations. For example, a cleave point associated with the exemplary subset of fields selected above (e.g., Social Security Number field, Date Of Birth field) may be identified in an entity representation by identifying: (1) an entity representation; (2) containing at least two records with different field values in the Social Security Number field; and (3) the same two records having different field values in the Date Of Birth field. By way of a non-limiting example, consider the following entity representation:

| Record | DID | First Name | Last Name | Social Security Number | Date Of Birth |
|---|---|---|---|---|---|
| $r_1$ | 4 | John | Smith | 123-45-6789 | 3/24/1981 |
| $r_2$ | 4 | Jon | Smith | 123-45-6789 | 3/24/1981 |
| $r_3$ | 4 | John | Smith | 123-45-6789 | 3/24/1981 |
| $r_4$ | 4 | John | Smith | 123-45-6789 | 3/24/1981 |
| $r_5$ | 4 | J. | Smith | 123-44-6789 | 3/25/1981 |
| $r_6$ | 4 | John | Smith | 123-44-6789 | 3/24/1981 |
| $r_7$ | 4 | John | Smith | 123-45-6789 | 3/24/1981 |

Continuing the non-limiting example above, a selected subset of fields may include a Social Security Number field with a field inconsistency weight of −24 and a Date Of Birth field with a field inconsistency weight of −23. Thus, the selected subset of fields has a total field inconsistency weight of −47 whose magnitude exceeds the exemplary threshold of −40. Accordingly, a cleave point may be identified in the entity representation illustrated above since the entity representation contains at least two records with different field values in the Social Security Number field and two records with different field values in the Date Of Birth field. Based on the different field values in the Social Security Number field (e.g., 123-45-6789, 123-44-6789) and the Date Of Birth field (e.g., Mar. 24, 1981, Mar. 25, 1981), the delinking technique may identify a cleave point between record $r_4$ and record $r_5$.

In some embodiments, whether there is a sufficient difference in field values between records may be determined using techniques described in the First Generation Patents And Applications of the Second Generation Patents And Applications. For example, whether there is a sufficient difference in field values between records may be determined in accordance with the techniques described in Sections III, IV, or X of U.S. patent application Ser. No. 12/429,408 entitled "Automated Calibration Of Negative Field Weighting Without The Need For Human Interaction," filed on Apr. 24, 2009, which is incorporated by reference herein in its entirety. In another example, whether there is a sufficient difference in field values between records may be determined in accordance with the techniques described in Section VI of U.S. patent application Ser. No. 12/496,876 entitled "A System And Method For Identifying Entity Representations Based On A Search Query Using Field Match Templates," filed on Jul. 2, 2009, which is incorporated by reference herein in its entirety.

At block 325, the exemplary embodiment splits (e.g., delinks) the entity representation into at least two separate entity representations at a cleave point. Since the records of an entity representation are linked by inserting a unique DID in a DID field of the entity representation, the records of the entity representation may be delinked by changing the field value in the DID field of one or more records. Further, the DID fields of the records of an entity representation created as a result of splitting an entity representation along a cleave point may include the lowest RID field value of the records of the created entity representation. By way of non-limiting example, exemplary entity representation C may be delinked as follows:

| Record | DID | RID | First Name | Last Name | Social Security Number | Date Of Birth |
|---|---|---|---|---|---|---|
| $r_1$ | 009 | 124 | John | Smith | 123-45-6789 | Mar. 24, 1981 |
| $r_2$ | 009 | 361 | Jon | Smith | 123-45-6789 | Mar. 24, 1981 |
| $r_3$ | 009 | 091 | John | Smith | 123-45-6789 | Mar. 24, 1981 |
| $r_4$ | 009 | 009 | John | Smith | 123-45-6789 | Mar. 24, 1981 |
| $r_5$ | 216 | 824 | J. | Smith | 123-44-6789 | Mar. 25, 1981 |
| $r_6$ | 216 | 216 | John | Smith | 123-44-6789 | Mar. 24, 1981 |
| $r_7$ | 216 | 432 | John | Smith | 123-45-6789 | Mar. 24, 1981 |

Continuing the non-limiting example above, the DID fields of the records of one entity representation (e.g., $r_1$, $r_2$, $r_3$, $r_4$) created as a result of splitting the entity representation along the cleave point (e.g., between record $r_4$ and record $r_5$) may include the lowest RID field value (e.g., 009) of the records of that created entity representation. Further, the DID field values of another entity representation (e.g., $r_5$, $r_6$, $r_7$) created as a result of splitting the entity representation along the cleave point may include the lowest RID field value of the records of that created entity representation (e.g., 216). That is, each entity representation created as a result of splitting an entity representation along a cleave point may be uniquely identifiable in the electronic database.

In certain embodiments, multiple cleave points based on the same subset of fields may be identified in one entity representation. In such embodiments, the records of the entity representation in which the fields values are the same in the subset of fields are grouped together. Each group of records is then split (e.g., delinked) into a new entity representation. By way of a non-limiting example, consider the following exemplary entity representation in which the Last Name field and the Social Security Number field are the subset of fields:

| Record | DID | First Name | Last Name | Social Security Number | Date Of Birth |
|---|---|---|---|---|---|
| $r_1$ | 4 | John | Smith | 123-45-6789 | 3/24/1981 |
| $r_2$ | 4 | John | Smithinson | 123-44-6789 | 3/24/1981 |
| $r_3$ | 4 | John | Smith | 123-44-6989 | 3/24/1981 |
| $r_4$ | 4 | John | Smith | 123-45-6789 | 3/24/1981 |
| $r_5$ | 4 | John | Smith | 123-44-6989 | 3/24/1981 |

Continuing the non-limiting example, the exemplary entity representation contains multiple cleave points, the records of the exemplary entity representation in which the fields values are the same in the subset of fields are grouped together. The exemplary entity representation may appear as follows after the grouping step:

| Record | DID | First Name | Last Name | Social Security Number | Date Of Birth |
|---|---|---|---|---|---|
| $r_1$ | 4 | John | Smith | 123-45-6789 | 3/24/1981 |
| $r_4$ | 4 | John | Smith | 123-45-6789 | 3/24/1981 |
| $r_2$ | 4 | John | Smithinson | 123-44-6789 | 3/24/1981 |
| $r_3$ | 4 | John | Smith | 123-44-6989 | 3/24/1981 |
| $r_5$ | 4 | John | Smith | 123-44-6989 | 3/24/1981 |

Finally, the exemplary entity representation may be split (e.g., delinked) along the first cleave point that exists between records $r_4$ and $r_2$ and the second cleave point that exists between records $r_2$ and $r_3$. Accordingly, the exemplary entity representation may be split (e.g., delinked) into three separate entity representations.

Any of the techniques disclosed herein may be applied to a portion of an electronic database as opposed to the entirety of a database.

The techniques discussed herein may be combined with any of the techniques disclosed in the First Generation Patents And Applications. The inventors explicitly consider such combinations at the time of filing the present disclosure.

The equations, formulas and relations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

Any of the steps of FIG. 1 and FIG. 3 may be performed by a properly programmed computer.

Embodiments, or portions of embodiments, disclosed herein may be in the form of "processing machines," such as general purpose computers, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. In particular, the hardware described in the First Generation Patents And Applications may be used for any embodiment disclosed herein. A cluster of personal computers or blades connected via a backplane (network switch) may be used to implement some embodiments.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated, for example, that the processor may be two ore more pieces of equipment in two different physical locations. The two ore more distinct pieces of equipment may be connected in any suitable manner. Additionally, the memory may include two or more portions of memory in two or more physical locations.

To explain further, processing as described above is performed by various components and various memories. However, it is appreciated that the processing performed by two or more distinct components as described above may, in accordance with a further embodiment of the invention, be performed by a single component. Further, the processing performed by one distinct component as described above may be performed by two or more distinct components. In a similar manner, the memory storage performed by two or more distinct memory portions as described above may, in accordance with a further embodiment of the invention, be performed by a single memory portion. Further, the memory storage performed by one distinct memory portion as described above may be performed by two or more memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer. The computer understands the machine language.

Any suitable programming language may be used in accordance with the various embodiments of the invention. Illustratively, the programming language used may include Enterprise Control Language ("ECL," available from LexisNexis), assembly language, Ada, APL, C, C++, dBase, Fortran, Java, Modula-2, Pascal, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements an embodiment may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In some embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

Accordingly, it is to be understood that this disclosure is only illustrative and exemplary and is made to provide an enabling disclosure. Accordingly, the foregoing disclosure is not intended to be construed or to limit the present invention or otherwise to exclude any other such embodiments, adaptations, variations, modifications or equivalent arrangements.

What is claimed is:

1. A computer-implemented process for delinking, based on a bloat index formula, entity representations in an electronic database associated with a population of individuals, the electronic database stored at least partially in a memory and comprising a plurality of entity representations, each entity representation comprising a plurality of linked electronic records that likely refer to a same individual of the population of individuals, each electronic record comprising a plurality of fields, each field capable of containing a field value, the process comprising:
    calculating a field inconsistency weight for a plurality of fields in the electronic database, wherein each field inconsistency weight is derived from a field inconsistency probability associated with the corresponding field and each field inconsistency probability reflects a likelihood that an arbitrary entity representation in the electronic database includes records with different field values in the corresponding field;
    selecting an entity representation in the electronic database;
    calculating, for the selected entity representation, a bloat index reflecting a sum of field inconsistency weights over a plurality of fields common to a plurality of linked electronic records of the selected entity representation;
    responsive to a field or record being added to the electronic database, determining, based on the bloat index and a known or expected size of the population of individuals associated with the electronic database, whether there is a sufficiently high confidence level that the plurality of linked electronic records of the selected entity representation do not correspond to the respective same individual; and
    delinking, by the processor, in the electronic database, each of the plurality of linked electronic records of the selected entity representation based on the determining;
    wherein an individual is at least one of a natural person and company.

2. The process of claim 1, wherein the determining comprises comparing the bloat index to a quantity derived from a threshold probability and the known or expected size of the population of individuals associated with the electronic database.

3. The process of claim 2, wherein the threshold probability, T, is calculated based at least on:

$$T = \log(N) - \log(1-P) - 1,$$

wherein N represents the known or expected size of the population of individuals associated with the electronic database and P is a number selected from the interval [0,1).

4. The process of claim 1, wherein each field inconsistency probability, $p_f$, associated with the respective corresponding field, f, is calculated based at least on:

$$p_f = \frac{K_f}{K},$$

wherein $K_f$ represents a number of entity representations including at least two records with different field values in field f, and K represents a total number of entity representations.

5. The process of claim 4, wherein $K_f$ represents a number of entity representations including two records with different field values in field f.

6. The process of claim 1, wherein the bloat index, B(C), for the selected entity representation, C, is calculated based at least on:

$$B(C) = \sum_f w_f$$

wherein $w_f$ are the field inconsistency weights over the fields, f, of the selected entity representation that have different field values in at least two records of the selected entity representation.

7. The process of claim 1, wherein each respective field inconsistency weight for fields of the selected entity representation that have different field values in at least two records of the selected entity representation is multiplied by the number of different field values in the corresponding field of the selected entity representation.

8. The process of claim 1, wherein:
   prior to the delinking, the selected entity representation is associated with a first Definitive Identifier (DID) and each record of the identified entity representation refers to the first DID, and
   after the delinking, each record formerly of the identified entity representation refers to a different DID.

9. A system for delinking, based on a bloat index formula, entity representations in an electronic database representing a population of individuals, the electronic database stored at least partially in a memory and comprising a plurality of entity representations, each entity representation comprising a plurality of linked electronic records that likely refer to a same individual of the population of individuals, each electronic record comprising a plurality of fields, each field capable of containing a field value, the system comprising:
   a processor;
   a memory operatively coupled to the at least one processor and configured for storing data and instructions that, when executed by the processor, cause the system to perform a process comprising:
      calculating a field inconsistency weight for a plurality of fields in the electronic database, wherein each field inconsistency weight is derived from a field inconsistency probability associated with the corresponding field and each field inconsistency probability reflects a likelihood that an arbitrary entity representation includes records with different field values in the corresponding field;
      selecting an entity representation in the electronic database;
      calculating, for the selected entity representation, a bloat index reflecting a sum of field inconsistency weights over a plurality of fields common to a plurality of linked electronic records of the selected entity representation;
      responsive to a field or record being added to the electronic database, determining based on the bloat index and a known or expected number of individuals in the electronic database, whether there is a sufficiently high confidence level that the plurality of linked electronic records of the selected entity representation do not correspond to the respective same individual;
      delinking by the processor, in the electronic database, each of the plurality of linked electronic records of the selected entity representation based on the determining;
   wherein an individual is at least one of a natural person and a company.

10. The system of claim 9, wherein the determining includes comparing the bloat index to a quantity derived from a threshold probability and the total number of entity representations in the electronic database.

11. The system of claim 10, wherein the threshold probability, T, is calculated based at least on:

$T=\log(N)-\log(1-P)-1$, wherein N represents the total number of entity representations in the electronic database and P is a number greater than or equal to 0 and less than 1.

12. The system of claim 9, wherein each field inconsistency probability, $p_f$, associated with the respective corresponding field, f, is calculated based at least on:

$$p_f = \frac{K_f}{K},$$

wherein $K_f$ represents a number of entity representations including at least two records with different field values in field f, and K represents a total number of entity representations.

13. The system of claim 9, wherein the bloat index, B(C), for the selected entity representation, C, is calculated based at least on:

$$B(C) = \sum_f w_f$$

wherein $w_f$ is the field inconsistency weights over all fields f for the selected entity representation that have different field values in at least two records of the selected entity representation.

14. The system of claim 9, wherein each respective field inconsistency weight for fields of the selected entity representation that have different field values in at least two records of the selected entity representation is multiplied by the number of different field values in the corresponding field of the selected entity representation.

15. The system of claim 9, wherein:
   prior to the delinking, the selected entity representation is associated with a first Definitive Identifier (DID) and each record of the identified entity representation refers to the first DID, and
   after the delinking, each record formerly of the identified entity representation refers to a different DID.

16. A computer-implemented process for delinking, based on cleave points, entity representations in an electronic database associated with a population of individuals, the electronic database stored at least partially in a memory and comprising a plurality of entity representations, each entity representation comprising a plurality of linked electronic records that likely refer to a same individual of the population of individuals, each electronic record comprising a plurality of fields, each field capable of containing a field value, the process comprising:
   calculating a field inconsistency weight for each of a plurality of fields in the electronic database, wherein each field inconsistency weight is derived from a field inconsistency probability associated with the corresponding field and each field inconsistency probability reflects a likelihood that an arbitrary entity representation in the electronic database includes records with different field values in the corresponding field;

selecting a first subset of fields of the plurality of fields, wherein a sum of field inconsistency weights of the selected subset of fields exceeds a threshold wherein the threshold comprises a quantity derived from a threshold probability and the known or expected number of entity representations in the electronic database;

identifying an entity representation in the electronic database having inconsistent field values, between two records of the entity representation, in each field of the selected subset of fields; and delinking the identified entity representation along a first cleave point between the two records, wherein two separate entity representations are formed from the corresponding delinking.

17. The process of claim 16, wherein each field inconsistency probability, $p_f$, associated with the corresponding field, f, is calculated at least based on:

$$p_f = \left(1 - \frac{K_f}{K}\right),$$

wherein $K_f$ represents a number of entity representations including at least two records with different field values in field f, and K represents a total number of entity representations in the electronic database.

18. The process of claim 16, wherein each field inconsistency probability, $p_f$, associated with the respective corresponding field, f, is calculated based at least on:

$$p_f = \left(1 - \frac{K_f}{K}\right),$$

wherein $K_f$ represents a number of entity representations including at least two records with different field values in field f, and K represents a total number of entity representations in the electronic database including at least two different records.

19. The process of claim 16, wherein the threshold, T, is calculated based at least on:

$T = \log(N) - \log(1-P) - 1,$ wherein N represents the total number of entity representations in the electronic database and P is a number greater than or equal to 0 and less than 1.

20. The process of claim 16, wherein the selecting the subset of fields of the plurality of fields is based on a greedy selection of fields from the plurality of fields by magnitude of the corresponding field inconsistency weight.

21. The process of claim 16, further comprising:
delinking the identified entity representation along a second cleave point between another two records of the entity representation, the another two records having inconsistent field values in each field of the selected subset of fields.

22. The process of claim 16, wherein:
prior to the delinking the identified entity representation is associated with a first Definitive Identifier (DID) and each record of the identified entity representation refers to the first DID, and
after the delinking, the two separate entity representations are associated with different DIDs and each record of the two separate entity representations refers to the DID of the corresponding entity representation.

23. A system for delinking, based on cleave points, entity representations in an electronic database associated with a population of individuals, the electronic database stored at least partially in a memory and comprising a plurality of entity representations, each entity representation comprising a plurality of linked electronic records that likely refer to a same individual of the population of individuals, each electronic record comprising a plurality of fields, each field capable of containing a field value, the system comprising:
a processor;
a memory operatively coupled to the at least one processor and configured for storing data and instructions that, when executed by the processor, cause the system to perform a process comprising:
calculating a field inconsistency weight for each of a plurality of fields in the electronic database, wherein each field inconsistency weight is derived from a field inconsistency probability associated with the corresponding field and each field inconsistency probability reflects a likelihood that an arbitrary entity representation in the electronic database includes records with different field values in the corresponding field;
selecting a first subset of fields of the of the plurality of fields, wherein a sum of field inconsistency weights of the selected subset of fields exceeds a threshold, wherein the threshold comprises a quantity derived from a threshold probability and a known or expected size of the population of individuals associated with the electronic database;
identifying an entity representation in in the electronic database having inconsistent field values, between two records of the entity representation, in each field in the selected subset of fields; and
delinking the identified entity representation along a first cleave point between the two records, wherein two separate entity representations are formed from the corresponding delinking.

24. The system of claim 23, wherein each field inconsistency probability, $p_f$, associated with the respective corresponding field, f, is calculated based at least on:

$$p_f = \left(1 - \frac{K_f}{K}\right),$$

wherein $K_f$ represents a number of entity representations including at least two records with different field values in field f, and K represents a total number of entity representations in the electronic database including at least two different records.

25. The system of claim 23, wherein the threshold, T, is calculated based at least on:

$T = \log(N) - \log(1-P) - 1,$ wherein N represents the total number of entity representations in the electronic database and P is a number greater than or equal to 0 and less than 1.

26. The system of claim 23, wherein the selecting the subset of fields of the plurality of fields is based on a greedy selection of fields from the plurality of fields by magnitude of the corresponding field inconsistency weight.

27. The system of claim 23, the process further comprising:
delinking the identified entity representation along a second cleave point between another two records of the entity representation, the another two records having inconsistent field values in each field of the selected subset of fields.

28. The system of claim 23, wherein:

prior to the delinking, the identified entity representation is associated with a first Definitive Identifier (DID) and each record of the identified entity representation refers to the first DID, and after the delinking, the two separate entity representations are associated with different DIDs and each record of the two separate entity representations refers to the DID of the corresponding entity representation.

* * * * *